United States Patent
Luong et al.

(10) Patent No.: US 8,070,303 B2
(45) Date of Patent: Dec. 6, 2011

(54) OPTICAL STRUCTURES INCLUDING POLYUREA

(75) Inventors: Dzu D. Luong, West Hartford, CT (US); Patrick W. Mullen, Barkhamsted, CT (US)

(73) Assignee: Reflexite Corporation, Avon, CT (US)

(*) Notice: Subject to any disclaimer, the term of this patent is extended or adjusted under 35 U.S.C. 154(b) by 711 days.

(21) Appl. No.: 11/540,613

(22) Filed: Sep. 29, 2006

(65) Prior Publication Data
US 2007/0092699 A1 Apr. 26, 2007

Related U.S. Application Data

(63) Continuation-in-part of application No. 10/634,122, filed on Aug. 4, 2003, now abandoned.

(60) Provisional application No. 60/402,484, filed on Aug. 8, 2002.

(51) Int. Cl.
*G02B 5/124* (2006.01)

(52) U.S. Cl. ......... 359/530; 359/534; 359/619; 359/742

(58) Field of Classification Search ........... 359/515–904
See application file for complete search history.

(56) References Cited

U.S. PATENT DOCUMENTS

| | | | |
|---|---|---|---|
| 3,281,396 A | 10/1966 | Barnes | |
| 3,499,872 A | 3/1970 | Oertel et al. | |
| 3,770,481 A | 11/1973 | Canat | |
| 3,931,115 A | 1/1976 | Strassel | |
| 4,254,176 A | 3/1981 | Müller et al. | |
| 4,425,468 A | 1/1984 | Makhlouf et al. | |
| 5,030,514 A | 7/1991 | Hartman | |
| 5,126,170 A | 6/1992 | Zwiener et al. | |
| 5,194,113 A | 3/1993 | Lasch et al. | |
| 5,236,741 A | 8/1993 | Zwiener et al. | |
| 5,300,263 A | 4/1994 | Hoopman et al. | |
| 5,319,058 A | 6/1994 | Hattori et al. | |
| 5,706,132 A | 1/1998 | Nestegard et al. | |
| 5,822,120 A * | 10/1998 | Palazzotto et al. | ............ 359/515 |
| 5,836,674 A | 11/1998 | Nishitani et al. | |
| 5,840,352 A | 11/1998 | Shimizu et al. | |
| 5,936,770 A | 8/1999 | Nestegard et al. | |
| 5,962,144 A | 10/1999 | Primeaux, II | |
| 5,985,444 A | 11/1999 | Olson et al. | |
| 6,107,436 A | 8/2000 | Goeb et al. | |
| 6,130,730 A | 10/2000 | Jannson et al. | |

(Continued)

FOREIGN PATENT DOCUMENTS

EP 0 675 148 A1 10/1995

(Continued)

OTHER PUBLICATIONS

PCT International Preliminary Examination Report for PCT/US03/24522, Sep. 2, 2004.

(Continued)

*Primary Examiner* — James Phan
(74) *Attorney, Agent, or Firm* — LeClairRyan, a Professional Corporation

(57) ABSTRACT

Optical structures and sheeting that include polyurea and method for forming same are proposed in accordance with aspects of the present invention. One and two-component layers can be used to form the optical structures. The optical structures can include microstructures formed from polyurea. The sheeting can include at least one of cube-corner prisms, open-faced cube-corner prisms, linear prisms, lenticular lenses, moth-eye structures, lenses, Fresnel lens arrays, lenses, and fish-eye lens arrays.

1 Claim, 7 Drawing Sheets

U.S. PATENT DOCUMENTS

| | | |
|---|---|---|
| 6,163,402 A | 12/2000 | Chou et al. |
| 6,191,200 B1 | 2/2001 | Phillips |
| 6,197,393 B1 | 3/2001 | Jing et al. |
| 6,291,586 B2 | 9/2001 | Lasch et al. |
| 6,303,058 B1 | 10/2001 | Kelley et al. |
| 6,322,236 B1 | 11/2001 | Campbell et al. |
| 6,323,266 B2 | 11/2001 | Phillips |
| 6,350,823 B1 | 2/2002 | Goeb et al. |
| 6,372,341 B1 | 4/2002 | Jung et al. |
| 6,521,718 B2 | 2/2003 | Goeb et al. |
| 6,533,961 B2 | 3/2003 | Harelstad et al. |
| 6,797,789 B2 | 9/2004 | Davis et al. |
| 2001/0050356 A1 | 12/2001 | Crano et al. |

FOREIGN PATENT DOCUMENTS

| | | |
|---|---|---|
| EP | 1 121 973 A1 | 8/2001 |
| JP | 6-175134 | 6/1994 |
| JP | 07-258370 | 10/1995 |
| JP | 8-220542 A | 8/1996 |
| JP | 11-271503 A | 10/1999 |
| JP | 2000-193806 | 7/2000 |
| JP | 2001-294567 | 10/2001 |
| JP | 2001-305312 A | 10/2001 |
| JP | 2001-343505 A | 12/2001 |
| JP | 2002-527652 A | 8/2002 |
| JP | 2003-502707 A | 1/2003 |
| JP | 2003-156604 A | 5/2003 |
| WO | WO 99/23151 | 5/1999 |
| WO | 00/23257 A1 | 4/2000 |
| WO | 00/79315 A1 | 12/2000 |
| WO | 01/29587 A1 | 4/2001 |
| WO | 2004/014977 | 2/2004 |

OTHER PUBLICATIONS

Office Action for Corresponding Japanese Patent Application No. 2004-527762 (May 13, 2009).

Office Action for Corresponding Japanese Patent Application No. 2004-527762 (Nov. 13, 2009).

* cited by examiner

OPTICAL STRUCTURES INCLUDING POLYUREA

RELATED APPLICATIONS

This application is a continuation-in-part of U.S. patent application Ser. No. 10/634,122, filed on Aug. 4, 2003, now abandoned which claims the benefit of U.S. Provisional Patent Application No. 60/402,484, filed on Aug. 8, 2002. The entire teachings of both these applications are incorporated herein by reference.

BACKGROUND OF THE INVENTION

Polyurea materials are known in the industry because of use in extreme applications. Polyurea has properties, such as rapid cure, good weathering, desirable chemical properties, and abrasion resistance to exceptional physical properties, such as hardness, flexibility, and tear strength. Polyurea materials have at least two components: isocyanate containing material and an amine resin containing co-reactant. When the materials are mixed together, the isocyanates and the amine resins react to form a urea linkage.

SUMMARY OF THE INVENTION

Until now, sheet-like polyurea films and optical structures are not known to have been developed. Additionally, optical microstructures, such as cube-corner prisms, are not known to have been formed from polyurea material.

Optical structures and sheeting that include polyurea and method for forming same are proposed in accordance with aspects of the present invention. One and two-component layers can be used to form multi-layered optical structures. The optical sheeting can include microstructures formed from polyurea. The sheeting can include at least one of cube-corner prisms, open-faced cube-corner prisms, linear prisms, lenticular lenses, moth-eye structures, lenses, Fresnel lens arrays, lenses, and fish-eye lens arrays.

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention. All parts and percentages are by weight percent unless otherwise indicated.

DETAILED DESCRIPTION OF THE INVENTION

A description of example embodiments of the invention follows.

Figure 1:
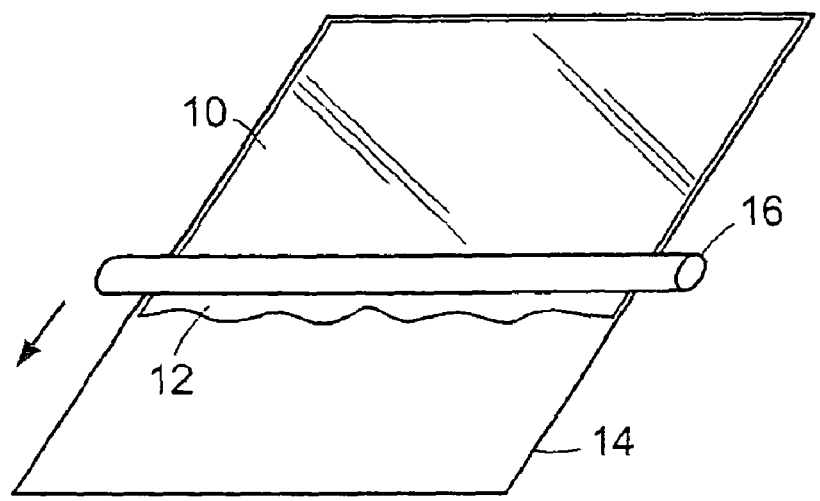
FIG. 1 is a perspective view of one embodiment of forming a polyurea sheet in accordance with one aspect of the present invention.
Figure 2:
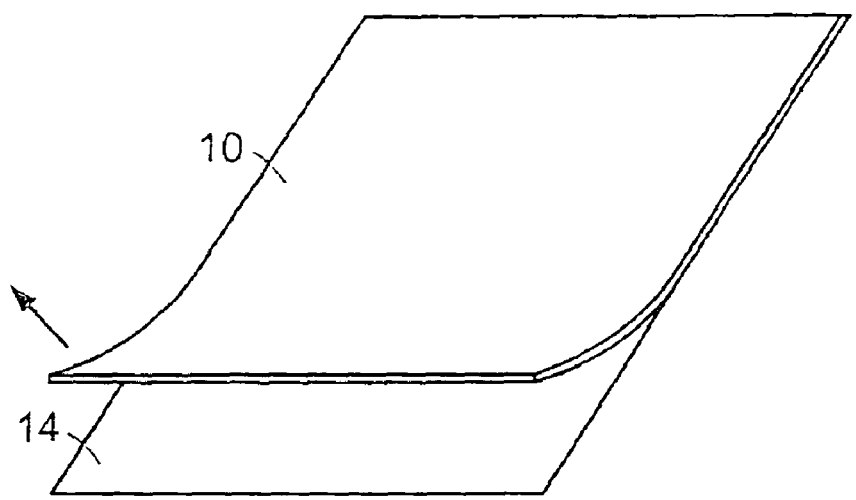
FIG. 2 is a perspective view of the cured polyurea sheet being removed from the underlying substrate in accordance with the embodiment illustrated in FIG. 1.

FIGS. 1 and 2 illustrate one embodiment of forming a polyurea film or sheet 10.

As used herein, the terms "sheet" and "film" can be used interchangeably. Generally, the term "sheet" can be defined as a broad, thin piece of material, while the term "film" can be defined as a thin, flexible transparent sheet. In some embodiments, both a sheet of polyurea and a film of polyurea are sufficiently flexible enough to roll up on itself. As shown in FIG. 1, polyurea 12 is poured onto a carrier sheet or substrate 14 which is selected such that the polyurea does not stick thereto. The carrier sheet or substrate 14 is selected to impart appropriate film surface optical properties and can be useful for adhering structures to the polymeric film in a future manufacturing step. In specific embodiments, the substrate 14 can include polyolefin, polyester, polyethylene terephthalate (PET), polycarbonate, or other suitable materials.

Thus, in the embodiment shown in FIG. 1, the polyurea 12 is applied to the substrate 14 and a suitable device, such as a board or wire wound rod 16, having a substantially straight edge is employed to level the polyurea. The polyurea sheet 10 is allowed to cure and the resulting sheet is then peeled off of the carrier substrate 14, as illustrated in FIG. 2. Such a sheet can have a thickness in the range of between about 2.5 and 500 micrometers.

Figure 3:
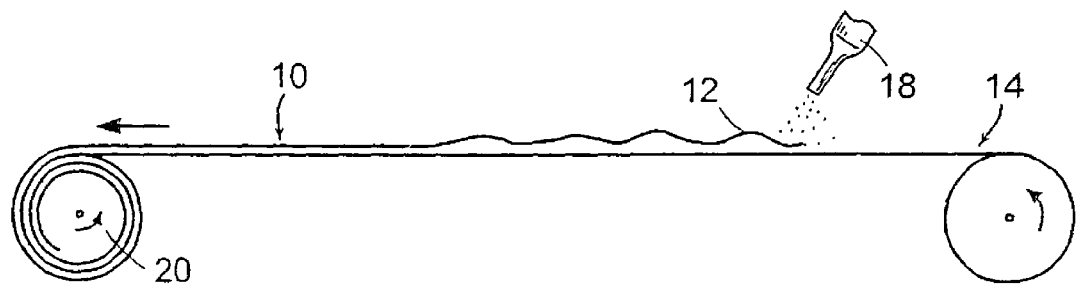
FIG. 3 is a schematic of another embodiment of forming polyurea sheeting in accordance with another aspect of the present invention.

In the embodiment of FIG. 3, polyurea 12 is sprayed or placed on the substrate 14, such as by a spray gun 18, and the polyurea is allowed to at least partially cure before being wound up on take-up roll 20. In a particular embodiment, the polyurea is allowed to slowly cure, for example, five to ten minutes, and the polyurea is self-leveling to form the polyurea sheet 10. The substrate 14 has, in particular embodiments, desired surface properties on both sides so that a wound roll of the layered film imparts the correct surface properties to both sides of the polyurea sheet.

Figure 4:
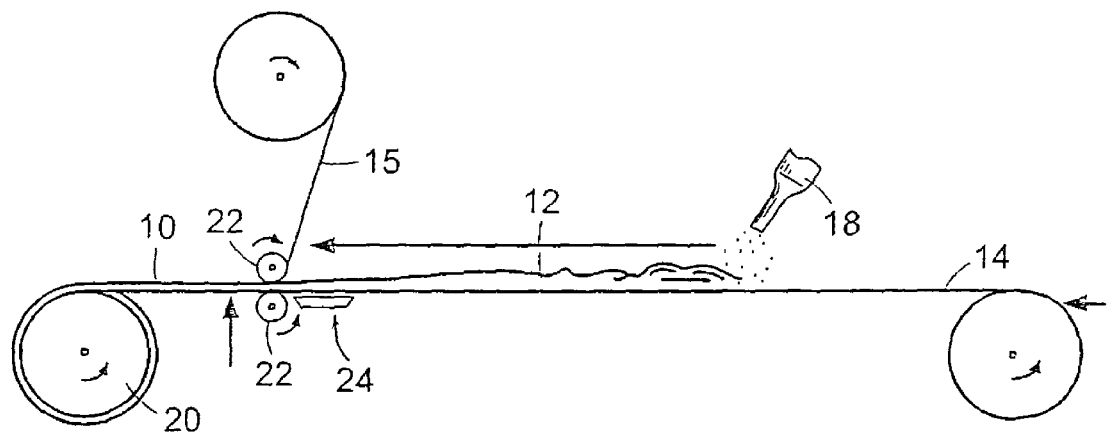
FIG. 4 is a schematic of yet another embodiment of forming polyurea sheeting in accordance with a further aspect of the present invention.

In the embodiment shown in FIG. 4, polyurea 12 is deposited, for example, by spray gun 18 onto carrier sheet or substrate 14, and a second carrier sheet or substrate 15 is provided on top of the polyurea at nip roller 22. Excess polyurea material is gathered at tray 24. The polyurea material sandwiched between the substrates 14, 15 is wound up by take-up roll 20. The thickness of the sheet 10 can be controlled by aging time of the polyurea after being deposited on the substrate 14, and by the pressure applied on the carrier substrates 14, 15 by nip roller 22. In one embodiment, the sheet can have a thickness in the range of between about 2.5 and 500 micrometers.

Figure 5:
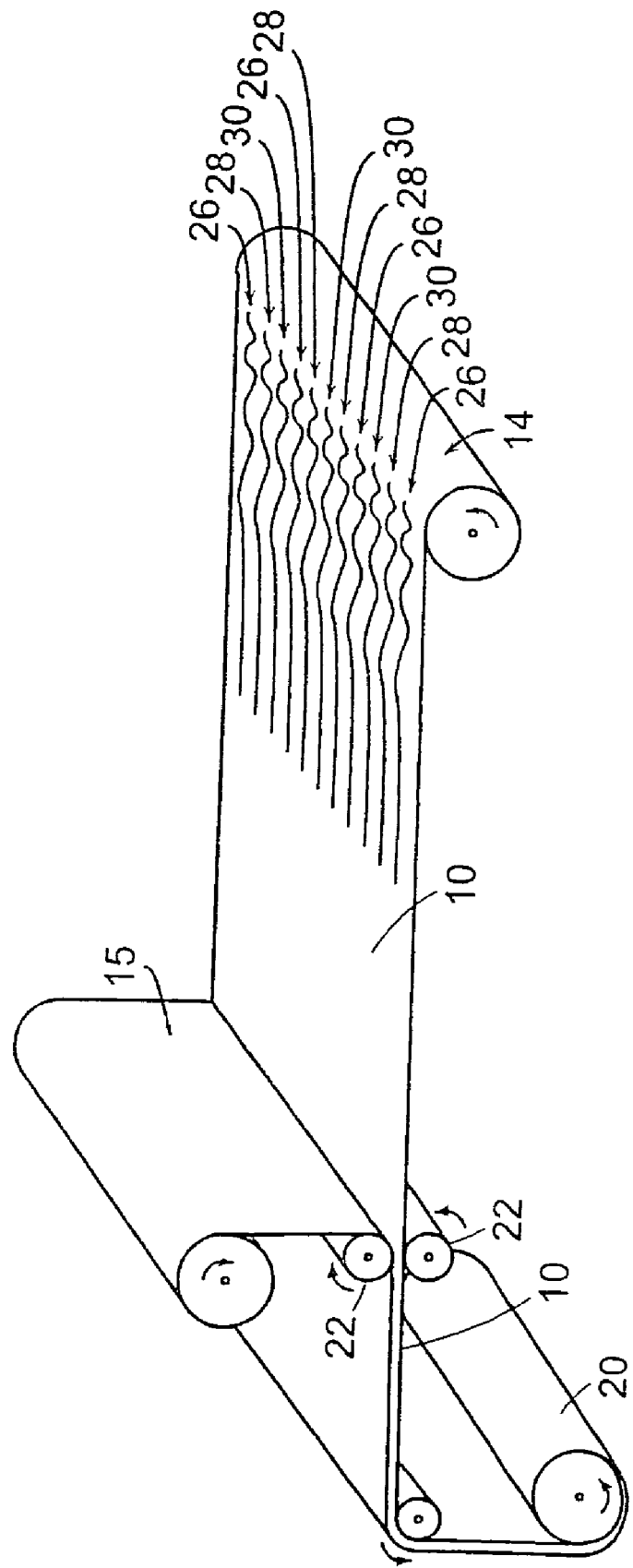
FIG. 5 is a schematic of yet another embodiment of forming polyurea sheeting in accordance with another aspect of the present invention.

FIG. 5 illustrates an embodiment of forming polyurea sheeting 10 in which an isocyanate prepolymer 26 is dispensed onto discrete portions of a sheet or substrate 14 and an amine resin 28 is dispensed onto discrete portions of the substrate 14 such that they are allowed to at least partially diffuse or mix into each other to form the polyurea sheeting 10. For example, the materials can be dispensed as very fine zig-zag lines adjacent one another. A fluorescent colorant, dye, pigment, or other suitable colorant 30, can also be dispensed onto the substrate 14 and allowed to diffuse into the isocyanate prepolymer 26 and the amine resin 28. A second sheet or substrate 15 can be applied at nip roller 22 to sandwich the polyurea sheeting between the substrates 14 and 15. The sandwiched sheeting can further be taken up by a take-up roller 20.

In other embodiments, the raw materials for forming the polyurea sheeting, such as the isocyanate prepolymer, the amine resin, and the dye, pigment, or colorant can be mixed and supplied onto a substrate by feeding the materials through a static mixer. An advantage of this method is that air bubbles are minimized, and preferably eliminated, in the mixed polyurea. In any of the embodiments herein, at least one of the substrates 14 and 15 can be pre-heated or vibrated or both to facilitate better mixing of the materials.

Figure 6:
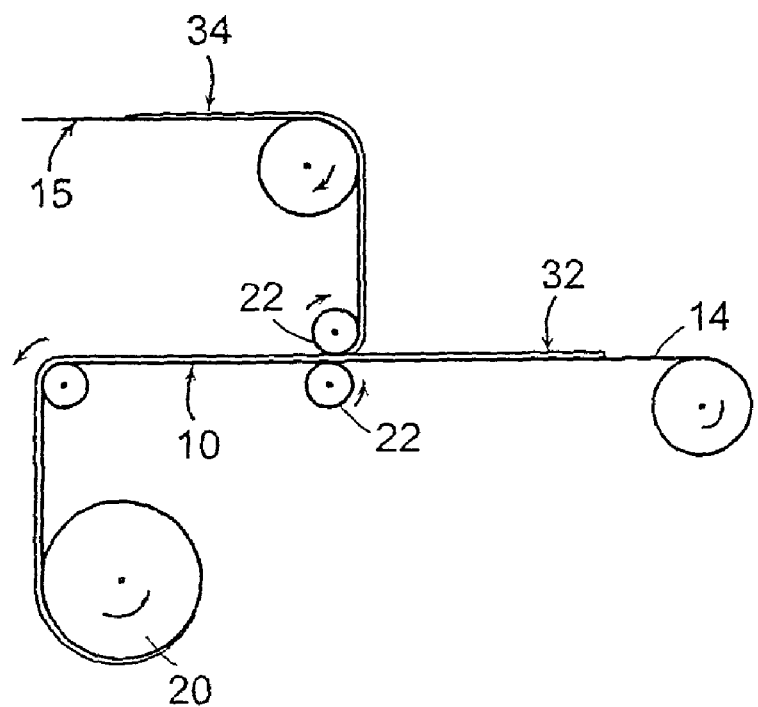
FIG. 6 is a schematic of a further embodiment of forming polyurea sheeting in accordance with another aspect of the present invention.

FIG. 6 illustrates yet another embodiment of forming polyurea sheeting in accordance with aspects of the present invention. A layer of isocyanate prepolymer 32 is provided on substrate 14, and a layer of an amine resin 34 is provided on substrate 15. The isocyanate prepolymer 32 is pressed against the amine resin 34 by nip roller 22 to form the polyurea sheeting 10, which can be taken up by take-up roller 20. At least one of the substrates 14 and 15 can be preheated to facilitate better mixing between the isocyanate prepolymer and the amine resin.

Figure 7:
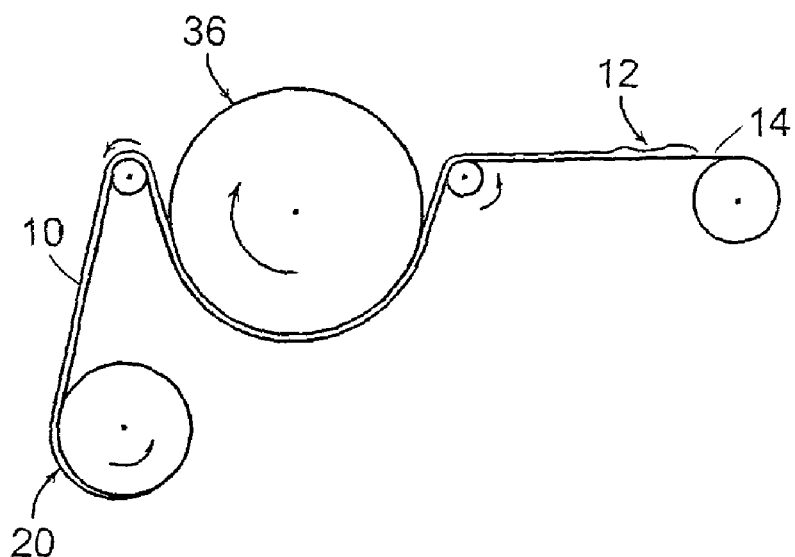
FIG. 7 is a schematic of an embodiment of forming polyurea sheeting which can include microstructures therein in accordance with another aspect of the present invention.

FIG. 7 illustrates another embodiment of forming polyurea sheeting 10 in which polyurea material 12 is provided on sheet or substrate 14. The polyurea material 12 is pressed against the substrate 14 by a roller 36, and the sheeting can be taken up by take-up roller 20. The surface of the roller 36 can be smooth to provide a substantially flat polyurea sheeting 10, or in other embodiments, the outer surface of the roller can include a microstructured surface to form microstructures in the polyurea sheeting 10. For example, the outer surface of the roller 36 can be structured to form at least one of cube-corner prisms, open-faced cube-corner prisms, linear prisms, lenticular lenses, cylindrical lenses, moth-eye structures, Fresnel lenses, Fresnel lens arrays, lenslets, surface relief diffusers, diffractive structures, light scattering structures, and fish-eye lens arrays in the polyurea sheeting. Additionally, the opposing side of the polyurea sheet 10 can also have a microstructured surface which can, in a particular embodiment, be formed with another roller similar to roller 36. The sheet can then be cut into particles, chips, or flakes that have the microstructured surface on both sides. A sheet 10 having only one side having a microstructured surface can also be cut into particles, chips, or flakes.

In other embodiments, the polyurea material can be used to form optical sheeting. Some or all of the optical sheeting can be formed from the polyurea. For example, the optical sheeting can be monolithic including microstructures formed from polyurea. Monolithic, two-sided open-faced prism sheeting can be formed from polyurea. The sheeting can be cut or diced into particles, chips, or flakes. The microstructures can include at least one of cube-corner prisms, open-faced cube-corner prisms, linear prisms, lenticular lenses, cylindrical lenses, moth-eye structures, Fresnel lenses, Fresnel lens arrays, lenslets, surface relief diffusers, diffractive structures, light scattering structures, and fish-eye lens arrays.

In any of the embodiments, an ultraviolet curable thermoset material can be used to form any of the sheets, films, substrates, or microstructures. In other embodiments, microstructures can be formed from a molded thermoplastic. The microstructures can be formed from a nickel-coated mold as disclosed, for example, in U.S. Pat. No. 3,689,346, issued to Rowland on Sep. 5, 1972, the entire teachings of which are incorporated herein by reference.

Cube-corner or prismatic retroreflectors are described in U.S. Pat. No. 3,712,706, issued to Stamm on Jan. 23, 1973; U.S. Pat. No. 3,684,348, issued to Rowland on Aug. 14, 1972; and U.S. Pat. No. 3,689,346, issued to Rowland on Sep. 5, 1972. Linear prisms are taught in U.S. Pat. No. 3,846,012, issued to Brown on Nov. 5, 1974; and U.S. Pat. No. 4,260,220, issued to Whitehead on Apr. 7, 1981. Moth-eye structures are disclosed in U.S. Pat. No. 4,013,465, issued to Clapham et al. on Mar. 22, 1977. Open-faced retroreflective sheeting is disclosed in U.S. patent application Ser. No. 09/488,129, filed Jan. 20, 2000. As set forth therein, the microstructured sheeting can be cut or formed into chips, flakes, or components. Fresnel lenses and lens arrays are disclosed, for example, in U.S. Pat. No. 5,840,352, issued to Shimizu et al. on Nov. 24, 1998. Lenslets are disclosed, for example, in U.S. Pat. No. 5,300,263, issued to Hoopman et al. on Apr. 5, 1994. Surface relief diffusers are disclosed in U.S. Pat. No. 6,130,730, issued to Jannson et al. on Oct. 10, 2000. Diffractive and light scattering structures are disclosed in U.S. Pat. No. 6,327,083, issued to Goldenberg et al. on Dec. 4, 2001 and U.S. Pat. No. 6,271,967, issued to Stork on Aug. 7, 2001. Fish-eye lens arrays are disclosed, for example, in U.S. Pat. No. 5,836,674, issued to Nishitani et al. on Nov. 17, 1998. The entire teachings of each of the patent documents identified above are incorporated herein by reference.

The polyurea microstructures can be formed or cast onto a film or sheet, such as a cured polyurea film 10 or other sheets formed from suitable material, such as polycarbonate. Polyurea material can also be used to form the optical structures including the binder disclosed in U.S. Provisional Patent Application No. 60/380,990, filed on May 15, 2002, the entire teachings of which are incorporated herein by reference. More specifically, two-sided retroreflective chips, flakes, or components can be dispersed in a binder.

In other embodiments, some or all of the optical sheeting or optical structure can be formed with fluorescent, colored, or tinted material to increase the visibility of the structure. A fluorescent colorant that can be used is disclosed in U.S. Pat. No. 6,323,266, issued to Phillips on Nov. 27, 2001, the entire teachings of which are incorporated herein by reference. More particularly, the fluorescent colorant can include a xanthene-based fluorescent dye. Also, the fluorescent dye can include a dye selected from a group consisting of fluoresceins, rhodamines, eosines, phloxines, uranines, succineins, sacchareins, rosamines, and rhodols. The fluorescent color can alternatively include a dye selected from the group consisting of anthraquinones, pyranines, benzopyrans, thioxanthenes, and perylene imides. An exemplary dye can be purchased from Keystone Analine Corporation, having a product description of Orange 63. Another exemplary dye can be purchased from BASF Chemical Corporation, having a product description of F300 Red.

In other embodiments, a polyol can be further included in the polyurea to improve flexibility of a structure formed therefrom. In a particular embodiment, the polyol can include a linear polyether polyol, or a branched polyether polyol, or both. In a particular embodiment, the linear polyether polyol can have a hydroxyl number in the range of between about 107 and 117, and can be purchased from Bayer Corporation, having a product name of BAYCOLL ND 1110. The branched polyether polyol can have a hydroxyl number in the range of between about 25 and 400, and can be purchased from Bayer Corporation, having a product name of BAYCOLL NT 1380. Other suitable polyols known to the urethane industry can be used in accordance with aspects of the present invention.

In some embodiments, the polyurea can have an amine-functional resin having an amine value of between about 100 and 300 and an equivalent average weight of about 279. An exemplary amine-functional resin can be purchased from Bayer Corporation, having a product name of DESMOPHEN NH 1420. Other low viscosity, secondary amines, such as polyaspartic esters with reactivity substantially lower than primary amines, are suitable in accordance with embodiments of the invention.

In other embodiments, the isocyanate used to make the polyurea can include an aliphatic polyisocyanate. In a particular embodiment, the isocyanate is a low viscosity aliphatic polyisocyanate resin based on hexamethylene diisocyanate (HDI). In a particular embodiment, the isocyanate includes a NCO group that is between about 1.48 and 2.88 percent. An exemplary aliphatic polyisocyanate can be purchased from Bayer Corporation, having a product name of DESMODUR N 3400. Other isocyanates, such as isophorone or hexane diisocyanate and the like, can be substituted in accordance with aspects of the present invention.

In other embodiments, the isocyanate is an aliphatic polyisocyanate having a low viscosity solvent-free polyfunctional aliphatic polyisocyanate resin based on hexamethylene diisocyanate (HDI). In a specific embodiment, the isocyanate includes a NCO group between about 22.5 and 23.5 percent. An exemplary isocyanate aliphatic polyisocyanate can be purchased from Bayer Corporation, having a product name of DESMODUR N 3600.

In further embodiments, a light stabilizer can be provided in the polyurea. An exemplary light stabilizer can be purchased from Ciba Speciality Chemicals under the trade name TINUVIN 123.

A method for forming a very flexible polyurea is also provided herein. A first premix is prepared by mixing trifunctional polyols with difunctional isocyanate to end-cap substantially all hydroxyl groups. A second premix is prepared by mixing polyfunctional isocyanate with difunctional polyols and further mixing in difunctional isocyanate to cap the polyfunctional isocyanate with difunctional polyol. The mixture is then end-capped with excess difunctional isocyanate to convert substantially all hydroxyl groups to isocyanates. The first premix and the second premix are then mixed together to obtain a substantially homogeneous prepolymer mixture. The substantially homogeneous prepolymer mixture is then mixed with the amine-resin to form the polyurea which can be used to form all or some of an optical structure.

In other embodiments, one-component polyurea can be used to form optical structures. An advantage of a sheet or film formed from one-component polyurea is that it is tough and durable. Another advantage is that the one-component polyurea does not adhere to certain layers, such as PET films. Examples of one-component polyurea are available from Engineered Polymers, Inc., for example, having product codes 1KSP and 1K800. In some embodiments, it can be difficult to form a layer of one-component polyurea, for example, thicker than about 25 micrometers (1 mil). It is believed that after the film is formed on the surface, the water and solvent cannot evaporate from underneath, which can cause incomplete polymerization. In one embodiment, a thicker sheet of one-component polyurea can be formed by applying a plurality of thin coats of one-component dispersion.

Sheeting formed from two-component polyurea, for example, an isocyanate and a resin blend, is known to be flexible. However, the sheeting can be difficult to peel off of certain layers or films, for example, a PET film. In other embodiments, a multi-layered or composition polyurea optical structure can be formed from one- and two-component polyurea layers to maximize the benefits of the one and two-component layers. For example, a relatively flexible polyurea sheet that is tough on the outer edges and that does not adhere to certain layers can be formed.

Figure 9:
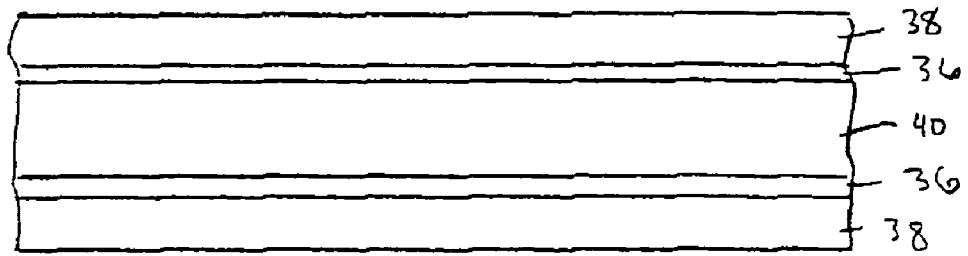
FIG. 9 is a side view of a polyurea optical structure that is provided in accordance with aspects of the invention.
Figure 10:
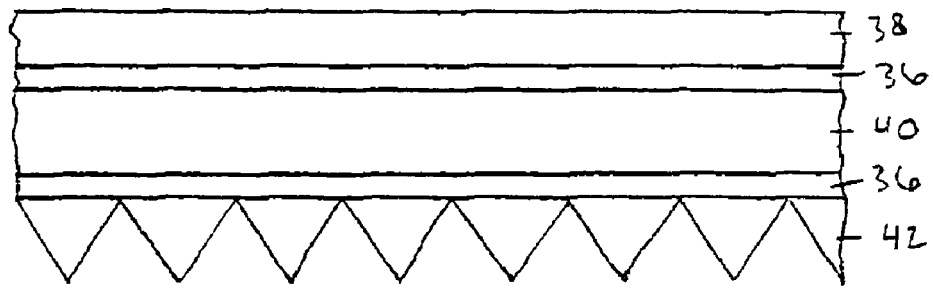
FIG. 10 is a side view of the polyurea optical structure of FIG. 9 in which the bottom layer has been removed and a microstructured layer has been formed on the structure.

FIGS. 9 and 10 illustrate an embodiment of a polyurea optical structure that is formed from one- and two-component polyurea layers. A one-component polyurea layer 36 can be formed on a layer 38, such as a PET film. A two-component polyurea elastomer layer 40, such as an aliphatic polyurea elastomer prepared by mixing an isocyanate component and a resin blend, can be formed on the one-component polyurea 36. Another one-component layer 36 can be provided on the two-component polyurea 40, and a layer 38, such as a PET film, can be provided on the layer 36 to provide the multi-layered polyurea structure illustrated in FIG. 9.

As illustrated in FIG. 10, one of the layers 38 can be removed and a microstructured layer 42, such as an array of cube-corner prisms, can be formed on layer 36. The polyurea optical structure can be attached to a garment by applying an adhesive, such as a heat-activated adhesive, on a metallized coating formed on the microstructured layer 42. The remaining layer 38 can be removed, if desired.

Figure 11:
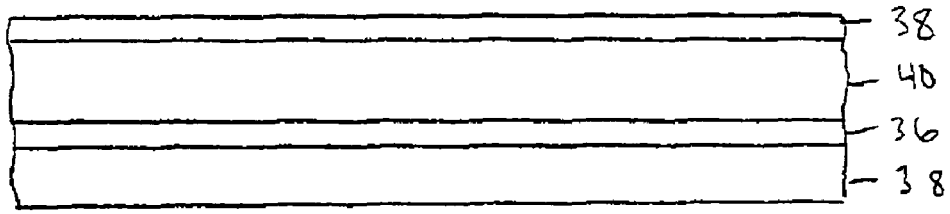
FIG. 11 is a side view of a polyurea optical structure that is provided in accordance with other aspects of the invention.
Figure 12:
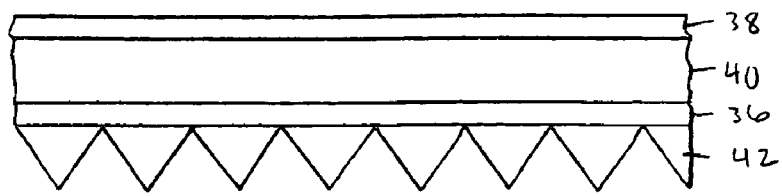
FIG. 12 is a side view of the polyurea optical structure of FIG. 11 in which the bottom layer has been removed and a microstructured layer has been formed on the structure.

FIGS. 11 and 12 illustrate another embodiment of a polyurea optical structure that is also formed from one- and two-component polyurea layers. A one-component polyurea layer 36 can be formed on a layer 38, such as a PET film. A two-component polyurea elastomer layer 40, such as an aliphatic polyurea elastomer prepared by mixing an isocyanate component and a resin blend, can be formed on the one-component polyurea 36. A layer 38, such as a PET film, can be provided on the layer 40. In other embodiments, the two-component polyurea layer 40 can be provided directly on the layer 38, obviating the need for the one-component polyurea layer 36. In further embodiments, a one-component polyurea layer can be formed on the top layer 38.

As illustrated in FIG. 12, the bottom layer 38 can be removed and a microstructured layer 42, such as an array of cube-corner prisms, can be formed on layer 36. In other embodiments, the one-component polyurea layer 36 is not present and the microstructured layer 42 is formed directly on the two-component polyurea layer 40. The polyurea optical structure can be attached to a garment by applying an adhesive, such as a heat-activated adhesive, on a metallized coating formed on the microstructured layer 42.

Figure 13:
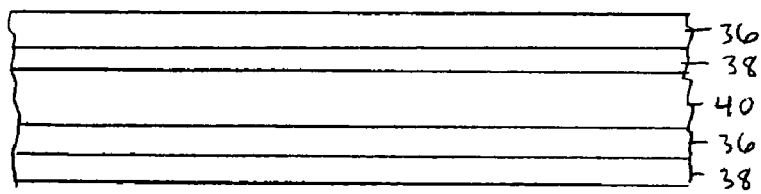
FIG. 13 is a side view of a polyurea optical structure that is provided in accordance with further aspects of the invention.
Figure 14:
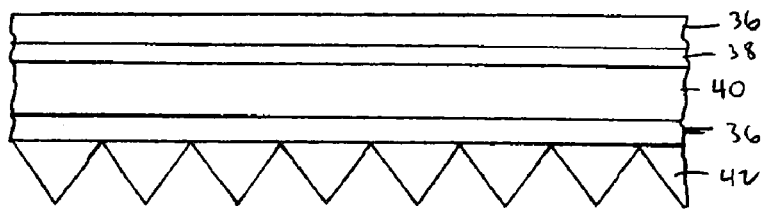
FIG. 14 is a side view of the polyurea optical structure of FIG. 13 in which the bottom layer has been removed and a microstructured layer has been formed on the structure.

FIGS. 13 and 14 illustrate yet another embodiment of a polyurea optical structure that can be formed from one- and two-component polyurea layers. A one-component polyurea layer 36 can be formed on a layer 38, such as a PET film. Another one-component layer 36 can be formed on another layer 38, such as a PET film. An optional two-component polyurea elastomer layer 40, such as an aliphatic polyurea elastomer prepared by mixing an isocyanate component and a resin blend, can be used to laminate layer 38 to layer 36, as shown in FIG. 13.

As illustrated in FIG. 14, the bottom layer 38 can be removed and a microstructured layer 42, such as an array of cube-corner prisms, can be formed on layer 36. The polyurea optical structure can be attached to a garment by applying an adhesive, such as a heat-activated adhesive, on a metallized coating formed on the microstructured layer 42.

In other embodiments, retroreflectors are provided that include retroreflective elements, such as glass beads. A procedure for forming the polyurea film with retroreflective glass beads includes securing a polyester film, such as a 5 mil (0.127 mm) MELINEX 617 film, to a bench top. A one-component polyurea coating, such as 1KSP, can be applied in a thin layer with a paint brush to form a first layer. The layer is dried for about five minutes using a heating gun. A second layer with the same consistency as the first layer is coated on the first layer. The second layer is allowed to air dry for about twelve minutes. Glass beads, such as type WGB254, refractive index 2.25±0.03, Asahi Techno Glass Corp., are scattered onto the second layer of the polyurea. The polyurea film with retroreflective glass beads is allowed to dry for another thirty minutes before handling. Any excess glass beads can be shaken and brushed off from the structure.

EXAMPLE 1

The flexibility of a polyurea film was improved by adding flexible polyols into the prepolymer.

The tear strength was improved by capping the polyfunctional reactive materials separately. Instead of creating a random network between isocyanates and polyols, this approach prevents the links between two polyfunctional reactive materials DESMODUR N 3600 and BAYCOLL NT 1380.

Two premixes of prepolymer were prepared separately and a tin catalyst was used to accelerate the reaction. In the first premix, trifunctional polyols (BAYCOLL NT 1380) were mixed with excess difunctional DESMODUR N 3400 to end cap all hydroxyl groups, creating isocyanate prepolymer with a flexible polyol backbone. In the second premix, polyfunctional DESMODUR N 3600 was capped with difunctional polyol BAYCOLL ND 1110. The mixture was then end-capped with excess difunctional DESMODUR N 3400 to convert all hydroxyl groups to isocyanates. Both premixes sat overnight at room temperature and then baked at 65° C. for two hours. The two premixes were mixed together to obtain a homogeneous prepolymer mixture. The prepolymer mixture was mixed with DESMOPHEN NH 1420 for one minute. The mixture was then vacuum deaerated and then aged about five to eight minutes. Polyurea films were made depositing the polyurea on a DuPont Mylar J-film and rolling on a PET film over the polyurea by a nip roller at about 350 kPa (50 psi).

Figure 8:
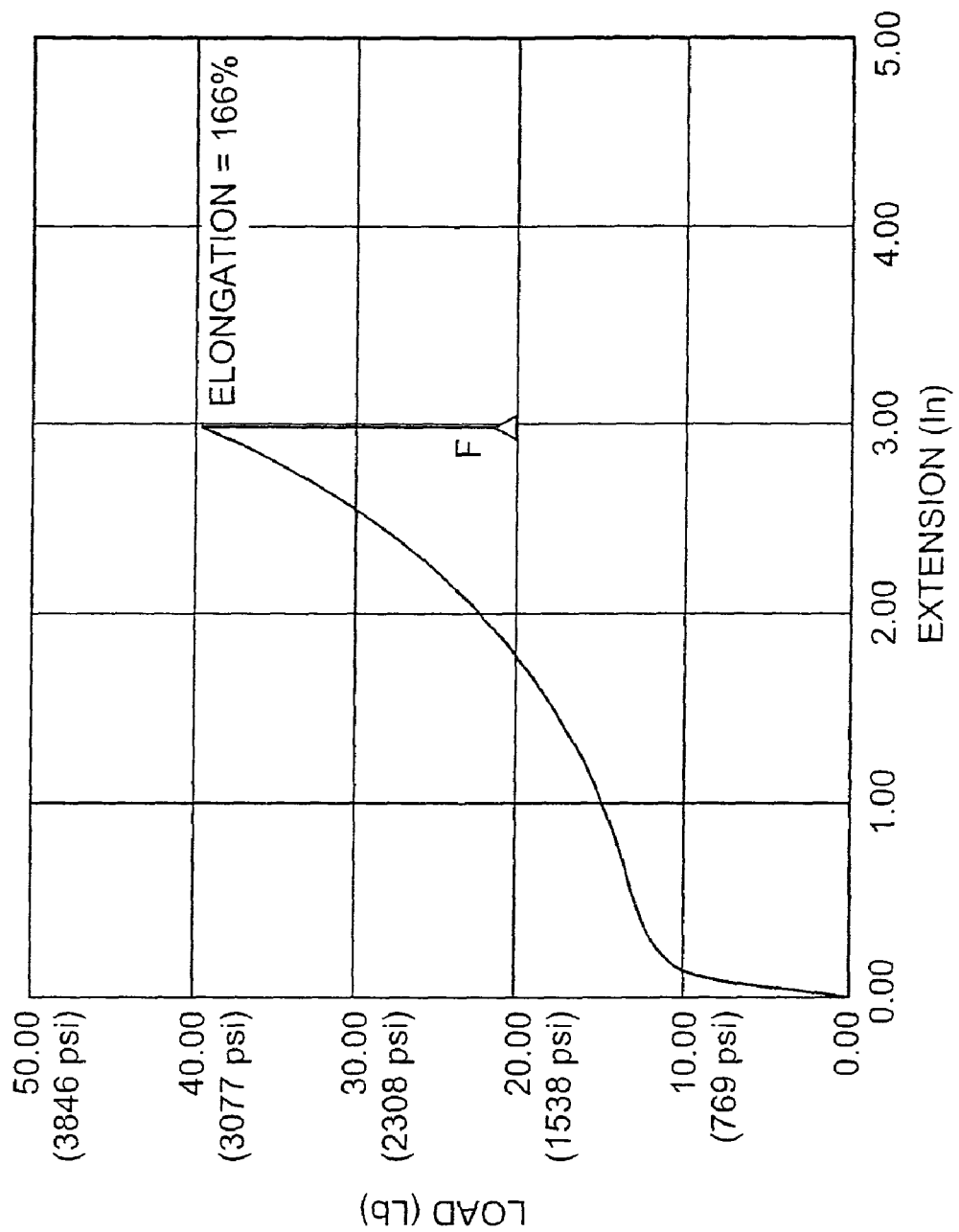
FIG. 8 is a plot illustrating the tensile strength of an exemplary polyurea sheet.

The sample was tested and was tack free after about one hour. The sample sat overnight to more fully cure. The sample was easily peeled off from both PET and DuPont Mylar J-Films. The resulting polyurea film is very soft (vinyl-like) and having good elasticity. FIG. 8 is a plot illustrating the tensile strength of a polyurea sheet in which an elongation of 166% was realized before tearing at a load of about 178 N (40 lbs).

EXAMPLE 2

The resin mixture of Example 1 was poured into a cube-corner prism mold with a 75 micrometer pitch and excess air was removed under vacuum. A polyethylene cover was placed over the resin and the sandwich was squeezed between rollers to form a smooth face. The polyethylene cover was removed after twelve hours and the cured polymer was pulled from the mold. The resulting microstructured cube-corner array displayed retroreflective brightness of about 509 cd/m2 at 0.2° entrance/5° observation angle.

EXAMPLE 3

Polyurea films were made from commercial product VersaFlex: "Aliphatic Clear Coat".

The aliphatic polyurea was aged for 3-18 minutes. The sample was then drawn down on PET film, tie-coated PE, MELINEX and Mylar J-Films (from E.I. Dupont de Nemours and Company) to form thin films of polyurea having a thickness in the range from about 20.32 to 83.82 micrometers (0.8 to 3.3 mils). These polyurea films were used as base films to cast cube-corner prisms. The resulting microstructured cube-corner array from these samples displayed a retroreflective brightness as illustrated in Table I below.

TABLE I

| Observation Angle (degrees) | | 5 | 10 | 20 | 30 | 45 |
|---|---|---|---|---|---|---|
| Aged 13 min (1.5~2.0 Mils)/ | observation angle of 0° | 227 | 186 | 135 | 87 | 83 |
| Tie Coated PE | observation angle of 90° | 197 | 165 | 118 | 80 | 70 |
| | Average Brightness | 212 | 175 | 127 | 83 | 76 |
| Aged 11 min (1.0 Mils)/ | observation angle of 0° | 263 | 215 | 152 | 95 | 83 |
| Mylar J | observation angle of 90° | 263 | 222 | 158 | 103 | 90 |
| | Average Brightness | 263 | 218 | 155 | 99 | 87 |
| Aged 3 min (1.5 Mils)/ | observation angle of 0° | 344 | 286 | 203 | 127 | 111 |
| MELINEX 617 | observation angle of 90° | 344 | 293 | 208 | 135 | 118 |
| | Average Brightness | 344 | 290 | 205 | 131 | 115 |
| Aged 4 min (1.0 Mils)/ | observation angle of 0° | 300 | 250 | 180 | 111 | 104 |
| MELINEX 617 | observation angle of 90° | 300 | 258 | 186 | 119 | 111 |
| | Average Brightness | 300 | 254 | 183 | 115 | 108 |
| Aged 9 min (0.8 Mils)/ | observation angle of 0° | 336 | 286 | 203 | 119 | 118 |
| MELINEX 617 | observation angle of 90° | 336 | 286 | 208 | 127 | 111 |
| | Average Brightness | 336 | 286 | 205 | 123 | 115 |
| Aged 18 min (1.8~3.4 Mils)/ | observation angle of 0° | 278 | 229 | 163 | 103 | 97 |
| untreated PE | observation angle of 90° | 285 | 236 | 175 | 111 | 104 |
| | Average Brightness | 282 | 233 | 169 | 107 | 101 |

EXAMPLE 4

A moisture curable polyurea resin, available from Visuron Technologies, Inc. having product code #6062, was spread onto a release coated nickel, cube-corner mold. The mixture was allowed to cure for 12 hours and then removed from the mold. The surface had a "wrinkled" appearance due to shrinkage. However, the resulting cube-corner structure displayed bright retroreflection indicating that it is a well-formed structure.

EXAMPLE 5

Ninety grams of the moisture curable polyurea resin #6062, which is available from Visuron Technologies, Inc., was mixed with 10 grams of aluminum metallized cube-corner chips. The mixture was poured onto a smooth acrylic sheet and allowed to cure for 24 hours. The resulting flexible, clear polyurea film containing the retroreflective elements was peeled from the acrylic sheet and displayed bright retroflection when light was directed toward it.

EXAMPLE 6

A mixture similar to that of Example 5 was made with 15 percent of the metallized cube-corner chips and poured onto glass, aluminum, and concrete. The samples were allowed to cure for 6 hours and the resulting coated objects retroreflected light when light was directed toward them.

EXAMPLE 7

Polyurea film cast as a two-part composition of JEFFAMINES and DESMODUR N 3400 was heated to 150° C. in order to insure complete cure. The resulting film was placed onto a release coated nickel cube-corner mold at about 175□C in a Carver press. The material was pressurized to 55.1 MPa (8,000 psi) for 3.5 minutes and then cooled. The polyurea film was removed from the mold and displayed bright retroreflection when light was directed toward it.

EXAMPLE 8

Polyurea film cast from water dispersion, one-component polyurea that can be purchased from Engineered Polymers, Inc. having product code 1KSP, was pressed onto a release coated nickel, corner-cube mold at 180° C. and 55.1 MPa (8,000 psi) for 4.5 minutes. The press was cooled and the film removed from the mold. The film displayed bright retroreflection when light was directed toward it.

EXAMPLE 9

One-component polyurea 1KSP was spread onto a release coated nickel, corner-cube mold and heated to 80° C. for 30 minutes to remove the water. The resulting film was removed from the mold and it was found to retroreflect light when light was directed toward it.

EXAMPLE 10

A 25 micrometer (1 mil) thick coating of one-component polyurea 1KSP was formed on a 51 micrometer (2 mil) thick PET film. The films were dried at 120° C. for 15 minutes to obtain about a 13 micrometer (0.5 mil) thick 1KSP film. The sample is referred to as a "1KSP/PET film". An aliphatic polyurea elastomer was prepared by mixing isocyanate and resin through a static mixer. A composition or multi-layered polyurea structure was formed by dispensing the polyurea elastomer on the 1KSP/PET film. A 1KSP film was formed on the polyurea elastomer and a PET film was formed on the 1KSP film. The composition polyurea structure was then sandwiched between a nip roller at about 350 kPa (50 psi) to form a smooth film. The film was then allowed to sit overnight to more fully cure.

The PET film was then peeled from one side and the structure was then baked at about 160° C. for 15 minutes to substantially eliminate moisture/solvent in the 1KSP layers. An array of cube-corner prisms was cast on the exposed 1KSP film. A heat-activated adhesive can be applied to the cube-corner prisms to attach the composition film to a garment. The remaining PET film can then be peeled off the multi-layered film.

EXAMPLE 11

Table II below illustrates various examples that were manufactured in accordance with embodiments of the invention.

TABLE II

| | Allphatic Polyurea Elastomer | | | | | | | |
|---|---|---|---|---|---|---|---|---|
| | Isocyanate Component | | | Resin Blend | | | | |
| Sample | DESMODUR N3400 | JEFFAMINE D2000 | JEFFAMINE XTJ-510 | JEFFAMINE D2000 | JEFFAMINE T5000 | JEFFAMINE XTJ-510 | REACTAMINE 400SP | DESMOPHEN NH 1420 |
| A | 64.00 | 36.00 | | 29.67 | 3.71 | 7.42 | | 59.20 |
| B | 61.04 | 38.95 | | 28.28 | 3.54 | 14.14 | | 54.04 |
| C | 61.92 | 38.08 | | 28.76 | 3.60 | 14.38 | 3.60 | 49.67 |
| D | 61.68 | 34.90 | 3.42 | 28.64 | 3.58 | 10.32 | 3.53 | 49.88 |
| E | 62.57 | 33.95 | 3.48 | 29.13 | 3.64 | 14.57 | 7.28 | 45.83 |
| F | 61.03 | 35.58 | 3.39 | 35.63 | 3.53 | 14.25 | 10.69 | 35.87 |
| G | 64.71 | 35.29 | | 30.31 | 3.79 | 15.15 | 15.15 | 35.60 |
| vinyl polyurethane | | | | | | | | |

| | 1K/2K Multilayer Polyurea Film (without carrier) | Cube-Corner Prisms on 1K/2K Polyurea Film SIA [cd/lux/m²] (Entrance/Observation |

TABLE II-continued

| Sample | Break Stress [psi] | Break Elongation [%] | Angle) (.2, +5) | (.33, +5) |
|---|---|---|---|---|
| A | 1846.8 | 175.6 | 1190 | 379 |
| B | 1884.1 | 227.1 | 1356 | 443 |
| C | 1837.4 | 235.4 | 1027 | 415 |
| D | 1730.8 | 202.5 | 976 | 382 |
| E | 1457.0 | 216.7 | 1392 | 449 |
| F | 942.0 | 200.3 | 1234 | 433 |
| G | 1185.1 | 211.0 | 1357 | 418 |
| vinyl | | | 920 | 373 |
| polyurethane | | | 828 | 308 |

With reference to Table II, JEFFAMINE products are available from Huntsman Corporation. REACTAMINE products are available from Engineered Polymers, Inc. All parts are by weight percent unless otherwise indicated.

Examples of one-component polyurea are available from Engineered Polymers, Inc., for example, having product codes 1KSP and 1K800. 1KSP is a high temperature polyurea that is hydrolytically stable while 1K800 is more flexible. Polyurea films based on these materials were made by drawing down a 25 micrometer (1 mil) thick coating of the material with a knife-blade applicator on a PET film having a thickness of about 51 micrometers (two mils). The material sat at room temperature for about 10 minutes and was then hung in the oven to dry at an elevated temperature of 120° C. for 15 minutes.

Two-component polyurea elastomers were prepared by mixing a polyisocyanate component and the resin blend through a static mixer. The materials used in these examples are summarized in Table II. The isocyanate component (which can be referred to as the "A-side" or the prepolymer) was prepared ahead of time by slowly adding amines (JEFFAMINE D2000 and/or XTJ-510) to DESMODUR N 3400, which was preheated at 60° C. The reaction mixture was mixed appropriately by maintaining a good vortex during the addition of amines, and moisture was isolated with a dry inert gas throughout the process.

The resin blend (which can be referred to as the "B-side" or mixture of amines) of each formulation was made by mixing components together using a stirrer for 10 minutes or until the mixture became uniform. The resin blend was then kept in a 60° C. oven for at least 1 hour to make sure it was homogeneously mixed.

Both sides were packed in 1:1 cartridges (volume ratio of 1.00) and kept at room temperature until used. For better mixing and dispensing effects, the cartridges were heated to 60° C. right before each application. The dispensing gun was set at 350 kPa (50 psi) for each individual extrusion process.

The composition or multi-layered polyurea structures with each two-component formulation are made by dispensing the polyurea elastomer on a one-component polyurea layer that is on a PET film. The polyurea elastomer is covered with a one-component polyurea layer and a PET film is provided on the one-component polyurea layer. The structure is rolled through a nip roller that applies a pressure of about 350 kPa (50 psi) to form a smooth film. The structure can be left overnight to more fully cure.

The PET film was peeled from one side of the structure, which was then baked at 160° C. for 15 minutes to eliminate or substantially reduce moisture/solvent in the one-component layers. The structure sample, which can be referred to as a "mono-carrier-multilayered polyurea film", can be used as a base film for retroreflective products.

Retroreflective products were prepared by casting cube-corner prisms on the one-component polyurea layer. As illustrated in Table II, the brightness of metalized cube-corner prism Samples A-G exhibits the compatibility of polyurea films to common flexible base films such as vinyl and polyurethane. These samples were laminated onto a garment using a heat-activated adhesive. These samples were then washed through 25 wash/dry cycles (60° C./43 minute wash cycle/65° C./20 minute dry cycle). Data generated indicate that after 25 wash/dry cycles all samples maintained flexibility with minimal loss of brightness.

Samples of PET/polyurea multi-layered films suitable for forming thin, high tensile strength retroreflective sheets were made by combining thin PET film (for example, having a thickness of 13 micrometers (0.5 mil or 0.48 gauge)) and one-component and two-component polyurea elastomers. In this example, the PET film was a 13 micrometer thick (0.5 mil) Mylar polyester film available from Dupont Teijin Films.

One-component water dispersion polyurea 1KSP was prepared as a thin coat on PET films, which had a thickness of about 51 micrometers (2.0 mils). Two-component polyurea elastomers were prepared by mixing a polyisocyanate component and the resin blend through a static mixer. The formulation used in this sample is the same as sample B in Table II.

The structure was prepared by dispensing the polyurea elastomer on 1KSP/PET film (same as Samples A through G). The polyurea elastomer was covered with a 13 micrometer thick (0.5 mil) PET film. A tie coat can be provided between the polyurea elastomer and the PET film. The structure was passed between a nip roller that applied a pressure of about 150 kPa (50 psi) to provide a smooth structure. The structure was allowed to sit overnight to more fully cure. The structure was then baked at 160° C. for 15 minutes to eliminate or substantially reduce moisture/solvent in the 1KSP layer. The tensile strength of this structure reached approximately 32.1 MPa (4,660 psi), which is far stronger than that of samples exhibited in Table II (about 6.6 MPa (1,884 psi)).

Retroreflective structures were prepared by casting cube-corner prisms on PET/polyurea multi-layered films. The protective PET layer was peeled off and the prisms were cast on the 1KSP layer. The brightness of this retroreflective film reached 1086 and 419 cd/lux/m2 at entrance angle/observation angles of 0.2/+5 and 0.33/+5, respectively, similar with other samples in Table II.

A metallized coating was formed on the cube-corner prisms. The retroreflective sample was laminated onto a garment by applying a heat-activated adhesive onto the metallized coating. The sample was then washed through 25 wash/dry cycles (60° C./43 minute wash cycle/65° C./20 minute dry cycle). The surface of the samples contained soft wrinkles like elephant skin, but the brightness loss was minimal.

EXAMPLE 12

A multi-layered polyurea film was formed by drawing down a hydrolytically-stable, one-component polyurea (1KSP) on a tie-coated PET film having a thickness of 13 micrometers (0.5 mils) to form a first composition layer. The sample was then dried and baked at 160° C. for 15 minutes. A one-component polyurea (1K800) was drawn down on a PET film, which had a thickness of 51 micrometers (2 mils), to form a second composition layer. This sample was then dried and baked at 160° C. for 15 minutes. The first and second composition layers were cleaned, dried, and laminated together with a two-component polyurea to provide flexibility in the resulting structure. The PET film having a thickness of 51 micrometers (2 mils) was removed and a microstructured layer was formed on the one-component polyurea (1K800).

EXAMPLE 13

A sample of pre-baked polyurea film as in sample C in Table II was formed. An approximate one mil thickness of 1KSP dispersion (Lot 806, One component polyurea from Engineered Polymers Inc.) was coated on a 2 mil PET film. The coated films were dried at 120° C. for 15 minutes to obtain about 0.5 mil 1KSP film. (hereinafter 1KSP/PET film). The aliphatic polyurea elastomers were prepared by mixing two parts (isocyanate and resin, or formulation C in Table II) though a static mixer. The composition polyurea film was made by dispensing the polyurea elastomer on 1KSP/PET film, and aging at 80° C. for 6 minutes. The polyurea elastomer was covered with another 1KSP/PET film (1KSP in contact with polyurea elastomer) and the nip roller was rolled over the layers at about 350 kPa (50 psi) to form a smooth film. The sample was left to sit overnight to be more fully cured.

EXAMPLE 14

Another sample of post-baked polyurea film as (C-2 post-baked) in sample C in Table II was formed. About 1 mil thickness of 1KSP dispersion (Lot 806, One component polyurea from Engineered Polymers Inc.) was coated on a 2 mil PET film. The coated films were dried at 120° C. for 15 minutes to obtain an about 0.5 mil 1KSP film. (hereinafter 1KSP/PET film). The aliphatic polyurea elastomers were prepared by mixing two parts (isocyanate and resin, or formulation C in Table II) though a static mixer. The composition polyurea film was made by dispensing the polyurea elastomer on 1KSP/PET film, and aging at RT for 13 minutes. The polyurea elastomer was covered with another 1KSP/PET film (1KSP to be in contact with polyurea elastomer) and the nip roller rolled over the layers at about 350 kpa (50 psi) to form a smooth film. The sample was left to sit overnight to be more fully cured. The PET film was peeled from one side, and the sample was baked at 160° C. for 30 minutes to eliminate moisture/solvent in 1KSP layers.

EXAMPLE 15

A sample of hand-cast polyurea film after 40 cycles of (60° C./20 min. wash)/(65° C./20 min. dry) was formed. An about 1 mil thickness of 1KSP dispersion (Lot 806, one component polyurea from Engineered Polymers Inc.) was coated on a 2 mil PET film. The coated film was dried at 120° C. for 15 minutes to obtain about 0.5 mil 1KSP film. (hereinafter 1KSP/PET film).

An about 1 mil thickness of 1K800 dispersion (one component flexible polyurea from Engineered Polymers Inc.) was coated on a 2 mil PET film. The coated films were dried at 120° C. for 15 minutes to obtain about 0.5 mil 1K800 film. (hereinafter 1K800/PET film). The aliphatic polyurea elastomers were prepared by mixing two parts (isocyanate and resin, or formulation C in Table II) though a static mixer. The composition polyurea film was made by dispensing the polyurea elastomer on 1KSP/PET film, and aging at RT for 11 minutes. The polyurea elastomer was covered with 1K800/PET film (1K800 to be in contact with polyurea elastomer) and a nip roller rolled over the layers at about 350 kPa (50 psi) to form a smooth film. The sample was allowed to sit overnight to more fully cure.

The PET film was peeled from the 1K800/PET side, and baked the sample at 160° C. for 30 minutes to eliminate moisture/solvent in 1KSP & 1K800 layers. Hand cast cube-corner prisms were made on the 1K800 layer. The cube-corner prisms were metalized with aluminum by vacuum deposition. The metalized sample was laminated on a garment with a heat-activated adhesive. The garment was then washed for 40 cycles of (60° C./43 min. wash)/(65° C./20 min. dry). The retroreflective structure and garment display retained a suitable appearance and characteristics.

EXAMPLE 16

A sample of polyurea cube-corner prisms were formed on PET film. The sample was a microstructures sheet which included polyurea as cube-corner prisms and a tie-coated PET as the carrier film. Two parts of the polyurea (VersaFlex Aliphatic Clear Coat) were used in this experiment. The materials were mixed well in a beaker and poured on a cube-corner prism tool, followed by a vacuuming process that eliminated air bubbles.

The sample was then covered with a tie-coated PET film, and rolled through a nip roller. After allowing the sample to set at room temperature for approximately 2 hrs, the sample was peeled from the tool. The thin uniform retroreflective sheet had a brightness of about 55 cd/lux/m2 at 0.2 & 5 degrees of entrance angle and observation angle respectively.

While this invention has been particularly shown and described with references to example embodiments thereof, it will be understood by those skilled in the art that various changes in form and details may be made therein without departing from the scope of the invention encompassed by the appended claims.

What is claimed is:

1. Optical sheeting that includes optical components disposed on a sheet wherein the optical components include polyurea; said polyurea optical components include at least one of cube-corner prisms, open-faced cube-corner prisms, linear prisms, lenticular lenses, moth-eye structures, lenses, Fresnel lens arrays, lenslets, and fish-eye lens arrays.

* * * * *